March 8, 1949.  G. M. McGUCKIN  2,463,788
APPARATUS FOR SOLUTION OF SNELL'S LAW
Filed Dec. 10, 1946  6 Sheets-Sheet 1
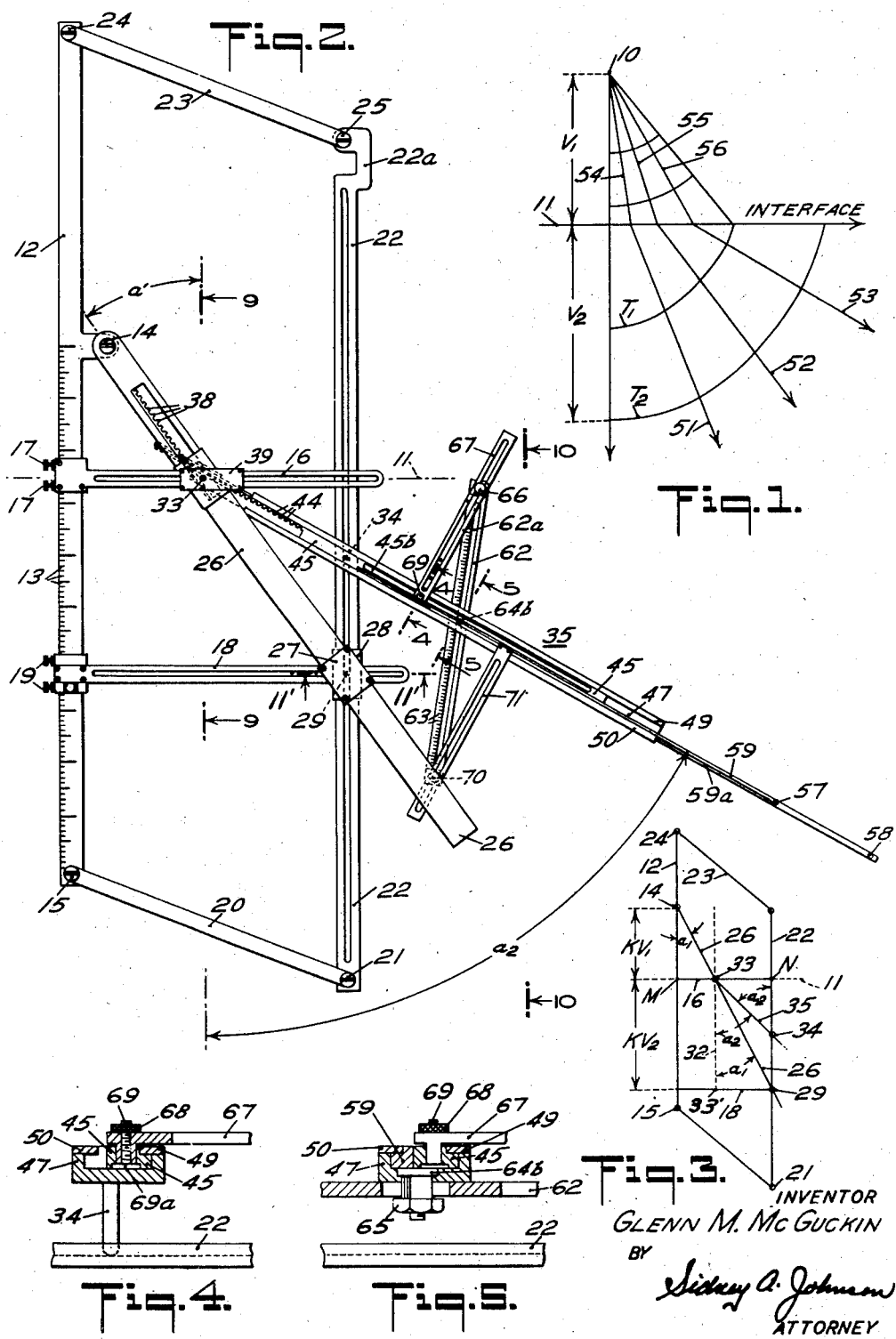
INVENTOR
GLENN M. McGUCKIN
BY
Sidney A. Johnson
ATTORNEY

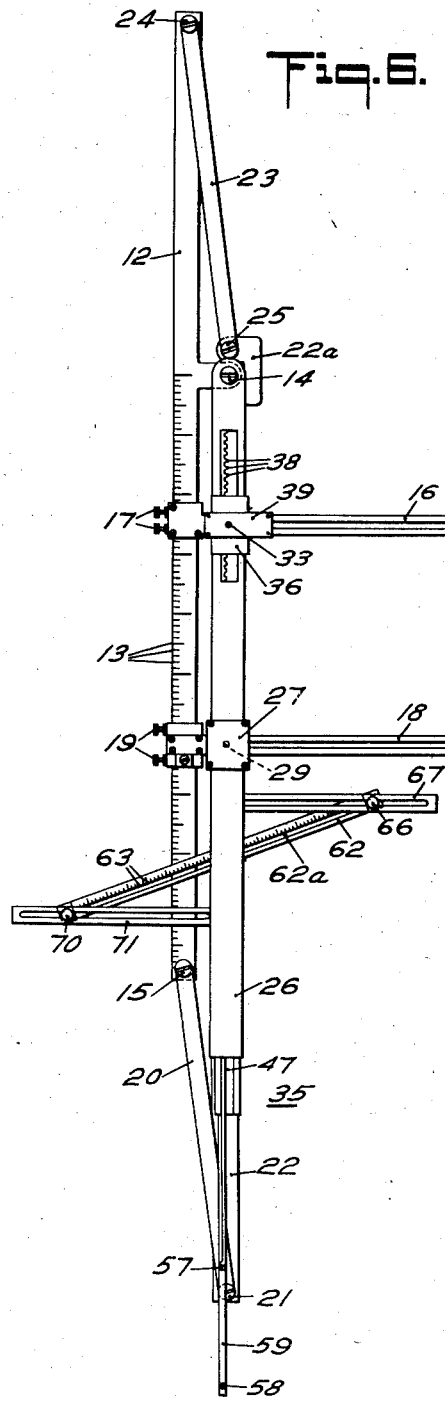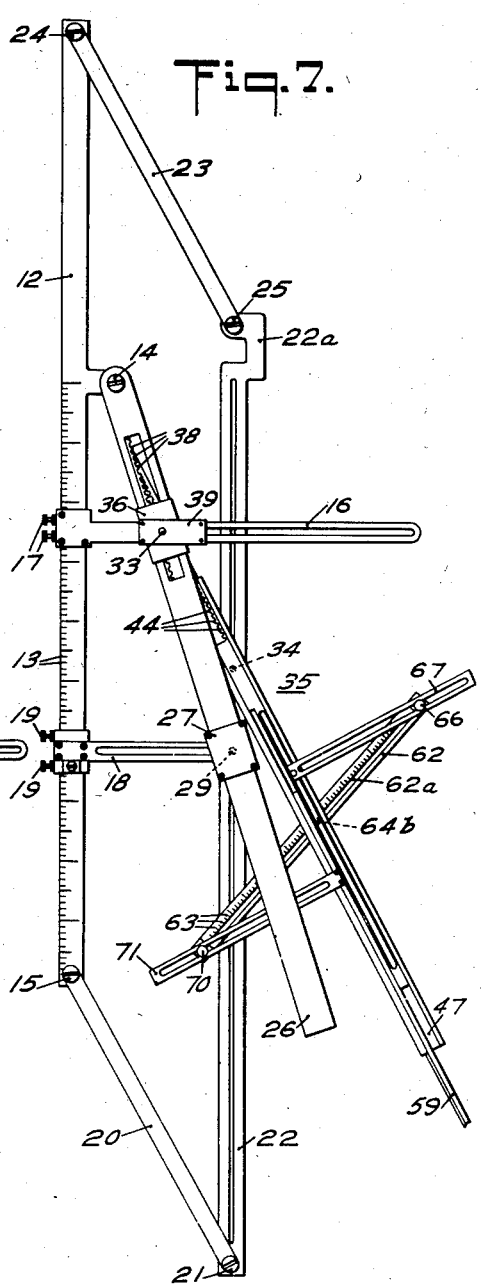

March 8, 1949.  G. M. McGUCKIN  2,463,788
APPARATUS FOR SOLUTION OF SNELL'S LAW
Filed Dec. 10, 1946  6 Sheets-Sheet 3
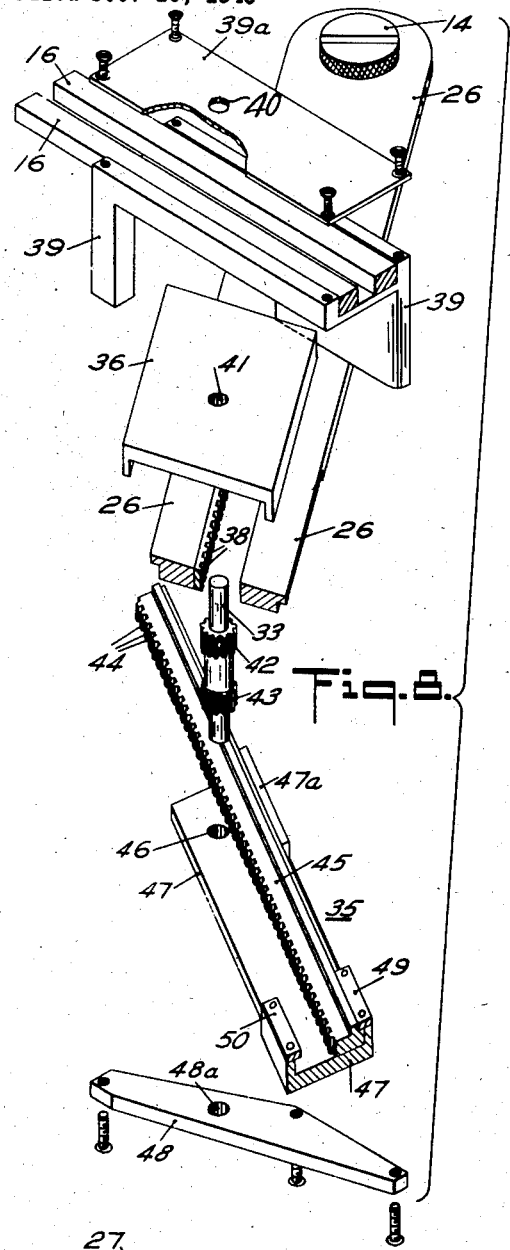
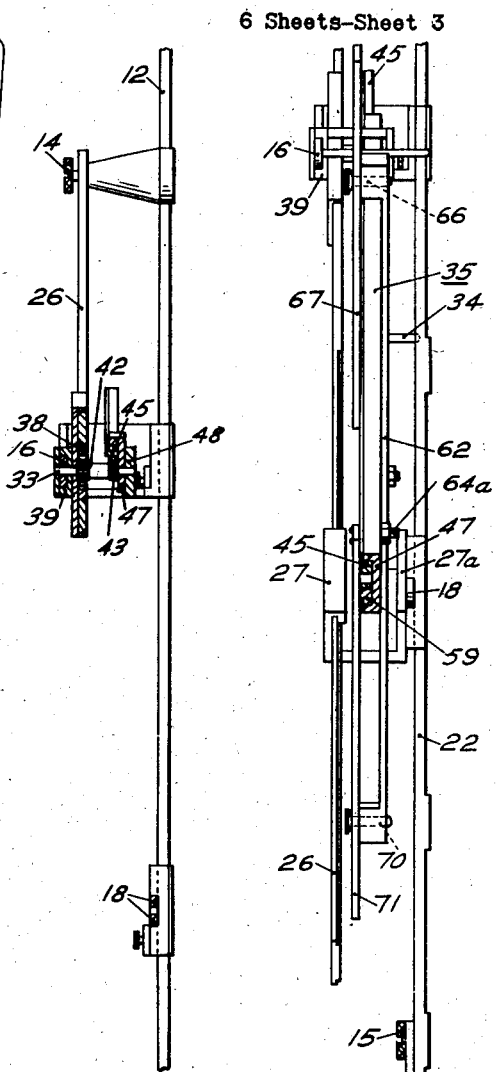
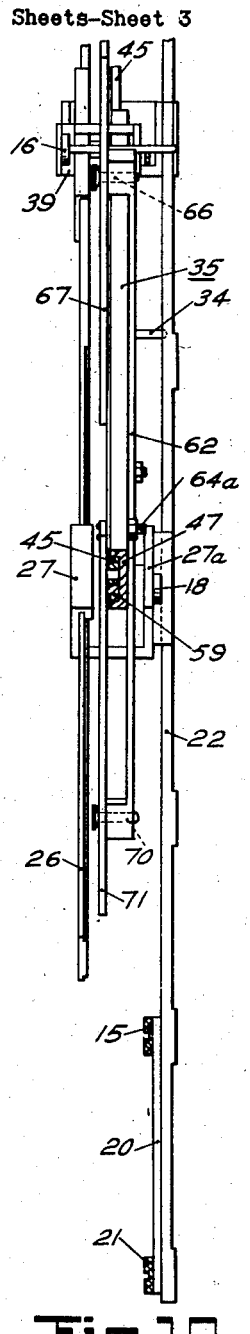
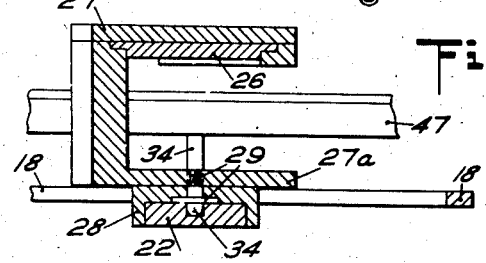
INVENTOR
GLENN M. McGUCKIN
BY
Sidney A. Johnson
ATTORNEY March 8, 1949.     G. M. McGUCKIN     2,463,788
APPARATUS FOR SOLUTION OF SNELL'S LAW
Filed Dec. 10, 1946     6 Sheets-Sheet 4

INVENTOR
GLENN M. McGUCKIN
BY
ATTORNEY

March 8, 1949.　　　　G. M. McGUCKIN　　　　2,463,788
APPARATUS FOR SOLUTION OF SNELL'S LAW
Filed Dec. 10, 1946　　　　　　　　　　　　6 Sheets-Sheet 5

INVENTOR
GLENN M. McGUCKIN
BY
ATTORNEY

March 8, 1949. G. M. McGUCKIN 2,463,788
APPARATUS FOR SOLUTION OF SNELL'S LAW
Filed Dec. 10, 1946 6 Sheets-Sheet 6

INVENTOR
GLENN M. McGUCKIN
BY
Sidney A. Johnson
ATTORNEY

Patented Mar. 8, 1949

2,463,788

UNITED STATES PATENT OFFICE 2,463,788

APPARATUS FOR SOLUTION OF SNELL'S LAW

Glenn M. McGuckin, Corpus Christi, Tex., assignor, by mesne assignments, to Socony-Vacuum Oil Company, Incorporated, New York, N. Y., a corporation of New York Application December 10, 1946, Serial No. 715,211

11 Claims. (Cl. 33—98)

1

This invention relates to an instrument or apparatus for solving problems arising in seismic surveying, particularly for the rapid and accurate solution of Snell's law and for the drawing of isotime curves of the travel of seismic waves in subsurface strata.

Though the invention is not limited thereto, it will be found particularly useful in utilizing the data secured as a result of seismic surveys, particularly in a study of the travel of a seismic wave from a subsurface stratum of one velocity characteristic through an adjacent subsurface stratum having a substantially different velocity characteristic. It is well understood by those skilled in the art that the interfaces or zones from which seismic waves are reflected are determined by the location of juncture of subsurface starta of substantially differing characteristics. The travel of a seismic wave from one such subsurface stratum to another is in accordance with Snell's law which is well understood by those familiar with physics. It states the relation between the incident angle and the refracted angle of a ray. If a ray or seismic wave of energy traverses one medium at a certain velocity and approaches at an angle the interface of said medium with a second medium, the ray or wave of energy will be refracted at the interface and transmitted through the second medium at a refraction angle for a given ray such that $$\frac{\sin i}{\sin r} = \frac{V_1}{V_2}$$

where
$i$ = the incident angle at the interface.
$r$ = the refracted angle at the interface.
$V_1$ = the velocity in the first medium.
$V_2$ = the velocity in the second medium.

In accordance with my co-pending application filed concurrently herewith Serial No. 715,213, I have disclosed and claimed an instrument which assists in the solution of problems based upon Snell's law. While that instrument has been found very useful in many calculations, it does not provide for a continuous solution of Snell's law with variation of one of the angles.

In carrying out the present invention in one form thereof, there is provided an appartus which not only presents a continuous solution of Snell's law, with variation of one of the angles, such as the incident angle, but also includes what is in effect a time-device by means of which isotime curves may be drawn, either singly or in multiple, for one or more selected time intervals after generation or creation of the seismic waves. By means of the present invention much time is saved in obtaining from seismic data useful information from which valuable deductions can be made as to the character of subsurface strata and the probaility of the occurrence of oil deposits.

2

For a more detailed disclosure of the invention and for further objects and advantages thereof, reference is to be had to the following description taken in conjunction with the accompanying drawings, in which:

Fig. 1 is a diagram explantory of the operation of the invention;

Fig. 2 is a plan view of an apparatus embodying the invention;

Fig. 3 is a single-line diagram, in part representative of the apparatus of Fig. 2;

Fig. 4 is a fractional sectional elevation taken on the line 4—4 of Fig. 2;

Fig. 5 is a fractional sectional elevation taken on the line 5—5 of Fig. 2;

Fig. 6 is a plan view of the apparatus of Fig. 2 in its fully-folded position;

Fig. 7 is a plan view of the apparatus partly unfolded;

Fig. 8 is an exploded perspective view of certain parts of the illustrated form of the invention;

Fig. 9 is a fractional sectional elevation taken on the line 9—9 of Fig. 2;

Fig. 10 is a fractional sectional elevation taken on the line 10—10 of Fig. 2;

Fig. 11 is a fractional sectional elevation taken on the line 11'—11' of Fig. 2;

Figure 15:
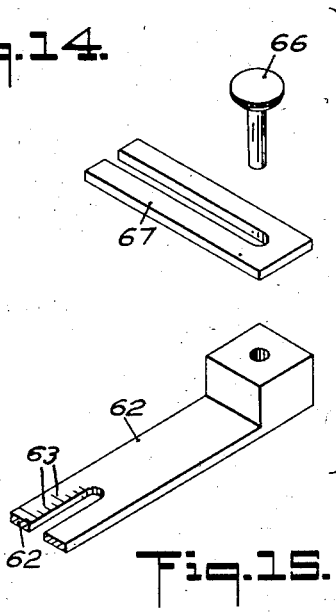
Figure 16:
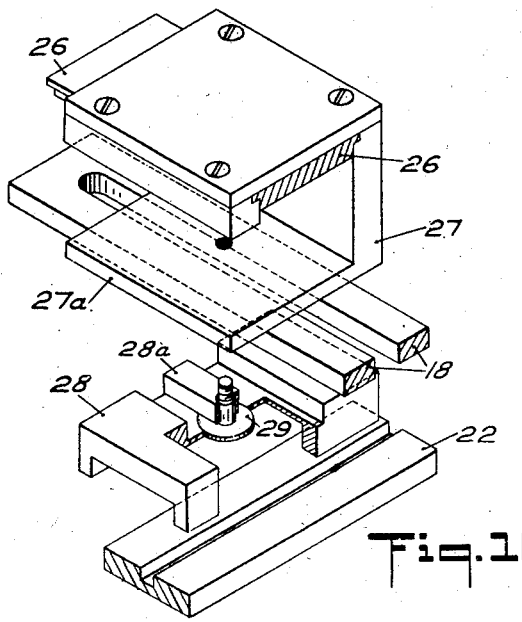

Fig. 15 is an exploded perspective showing the pivotal interconnection of timer bar 62 and the arm or bar 67; and Fig. 16 is an exploded perspective of certain of the parts which interconnect the incident arm 26, the arm 18, and the grooved bar 22.

Referring to the drawings, particularly Fig. 1, it is frequently desirable to know the path of a seismic wave originating at the point of origin or the shotpoint 10 at a predetermined time after initiation or creation thereof. Such a wave or waves move downwardly through a subsurface layer or medium at a velocity $V_1$ which is characteristic of that medium. If it strikes an interface as represented by the line 11, it will be refracted in accordance with Snell's law. If now it is desired to know where the wave is in the medium below the interface line 11 at a given time after the shot instant, it will be apparent that a large number of calculations will be required, followed by the plotting of the isotime curves, such as $T_1$ and $T_2$. These curves show the location of a seismic wave at the respective times $T_1$ and $T_2$ in the medium below the interface line 11. In general, the velocity increases as the depth increases. Where there are marked contrasts between the velocities in adjacent layers, reflections occur which are detected and recorded on seismograms. The location of each interface or the zone of velocity contrast may be thereby determined. The numerical velocity values for the particular subsurface layers or strata involved may be determined for the area under exploration in manner understood by those skilled in the art, and which frequently includes the location of geophones in wells drilled in the area at depths corresponding with those under consideration. Data obtained by such surveys are generally at hand.

Figure 12:
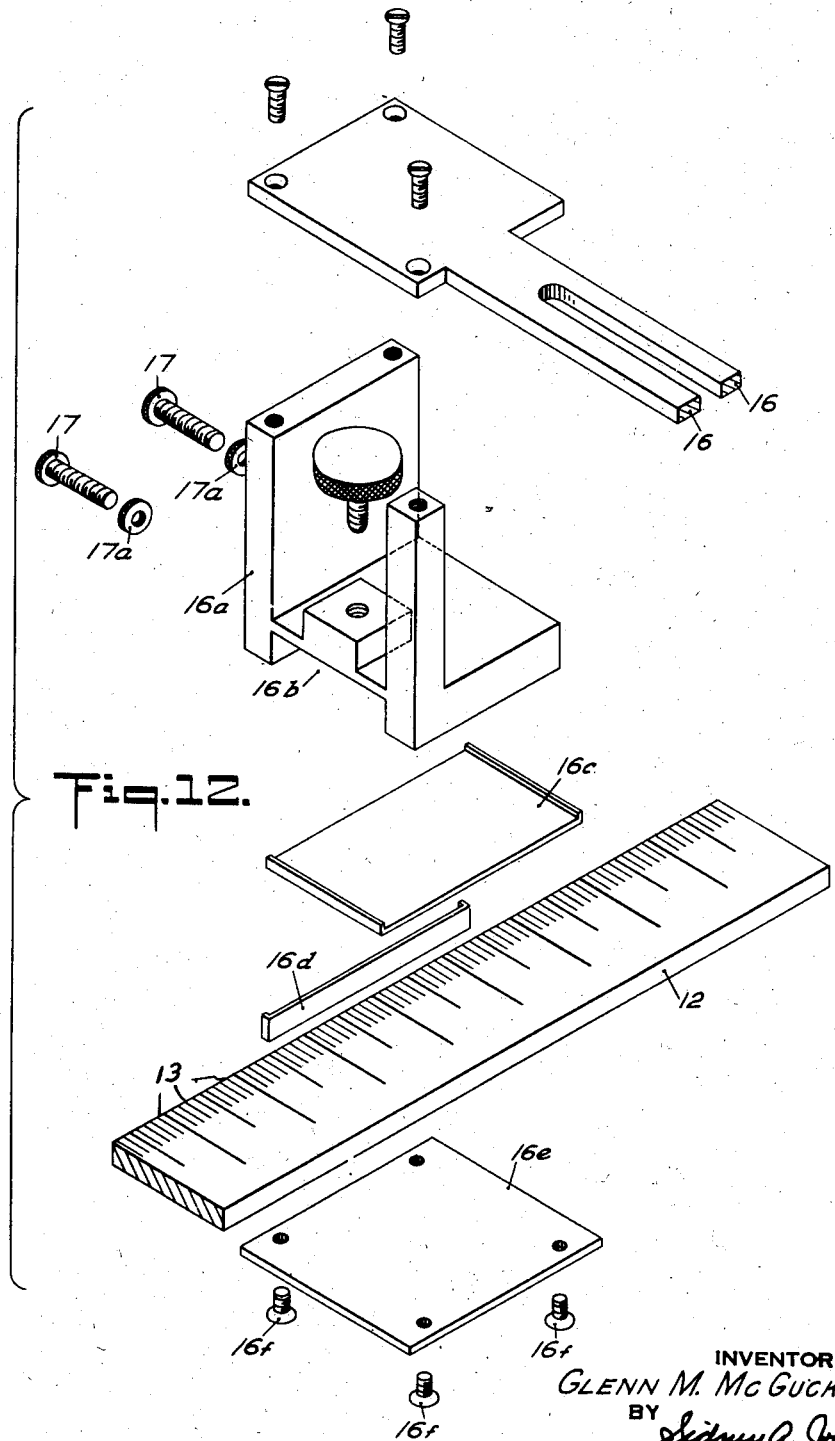
Fig. 12 is an exploded perspective of certain parts associated with arm 16 and member 12.

In its broader aspect, the present invention as illustrated in Fig. 2 includes a base member 12 on which various parts of the instrument are mounted. The base member itself is provided with a linear scale 13 extending from a point opposite a pivot pin 14 to a second pivot pin 15 for the purpose of setting a bar 16 at a desired distance below the pivot pin 14. The apparatus as a whole is located on drawing paper on which there has been marked, at a selected scale, the location of shotpoints and interface lines such, for example, as the line 11 of Fig. 1. In using the apparatus of Fig. 2, the pivot pin 14 is located directly over a selected shotpoint with the base member 12 extending normal to the interface 11. The bar 16 is then set on the scale 13 a distance below the pivot pin 14 corresponding with the location of the particular interface 11 under study. It is clamped thereto by means of clamping screws 17 and lock nuts 17a, Fig. 12. As best seen in Fig. 12, the bar 16 is secured by three screws to a slide 16a, having a U-shaped channel 16b arranged slidably to engage the member 12. An insert 16c of material (such as steel) to reduce sliding friction with the member 12 (of brass) may be used. Similarly, a side-insert 16d may be provided to engage the side of the slide 16a through which the clamping screws 17 extend. A cover plate 16e may be secured to the U-shaped member 16a, as by screws 16f. The assembly as a whole is rigid and serves to keep the bar 16 at right angles to the base member 12.

Figure 13:
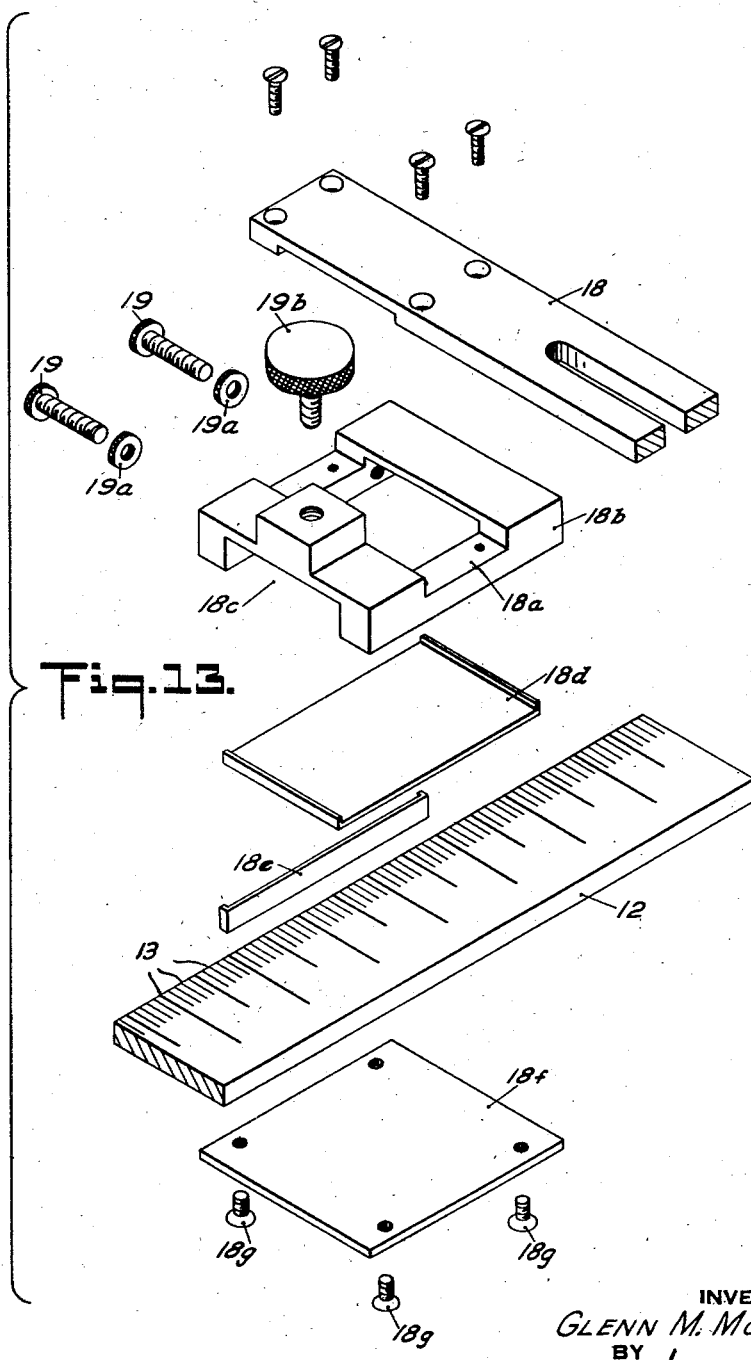
Fig. 13 is an exploded perspective of certain parts associated with the arm 18 and member 12.

A second bar 18, Fig. 2, also extends normally from the base member 12 and is also clamped in position by the screws 19 at a selected distance below the interface line 11. The exact position of the bar 18 will be later described. The bar 18, as best shown in Fig. 13, is secured by four screws in a channel 18a of a slide 18b having a second U-shaped channel 18c which slidably engages the base member 12. As in the case of the assembly of Fig. 12, anti-friction inserts 18d and 18e may be provided, as well as a cover plate 18f also of steel or other anti-friction material, which is held in place by four screws 18g. A double clamping means is provided comprising screws 19 and lock nuts 19a and a single clamping screw 19b which may be screwed down into clamping engagement with the insert 18d.

The inserts 16c and 16d of Fig. 12, and the inserts 18d and 18e may be provided with flanged ends which overlap the sides of the U-shaped channels to retain the inserts in place during adjustment or movement of the arms or bars 16 and 18.

From the pivot pin 15 of base member 12, Fig. 2, there extends a link 20 which is pivoted by a pin 21 to a grooved bar 22. The bar 22 is maintained parallel with the base member 12 by means of the link 20, and a second link 23 pivoted by pins 24 and 25 to the base member 12 and to the grooved bar 22. Though the links 20 and 23 permit the bar 22 to be moved toward and away from the frame member 12, it is always maintained parallel therewith. An incident bar 26 has one end pivotally secured by the pivot pin 14 to the base member 12. As best seen in Figs. 8, 11, and 16, the incident bar 26 is provided with shoulders and outward extensions which slidably connect it to complementary recesses in a C-shaped member 27, the lower leg 27a, Figs. 10, 11, and 16, of which is pivotally connected to a U-shaped guide 28 by means of a pivot pin or screw 29, having a shoulder adjacent the head portion which extends through and slightly beyond the opening in the guide 28. The adjacent sides of the guide 28 extend in overlapping relation with the grooved bar 22. The guide 28, Figs. 11 and 16, also is provided with slots on either side of a central ridge 28a which maintain it in position along the length of the slotted bar 18. It will, therefore, be seen, Fig. 2, that if the grooved bar 22 is to be moved toward the base member 12 the incident bar 26 will slide through the C-shaped member 27; that the guide 28 will be moved along the bar 18 toward the base member 12; and that there will be pivotal movement between the C-shaped member 27 and the guide 28.

The description of the apparatus will now be interrupted by reference to the schematic diagram of Fig. 3 where the principal pivot points have been designated and straight lines utilized to represent the main elements of the apparatus. From a consideration of Fig. 3, it will be observed the angle $a_1$ between the vertical base member 12 and the incident line or bar 26 represents the path of a wave originating from the shotpoint designated at the apex of the angle by the pivot pin 14. The length of the bar 18 from the vertical line 12 to its point 29 of intersection with the incident line 26 varies with the sine of angle $a_1$. Thus, as the bar 22 is moved nearer to the line 12, the angle $a_1$ decreases and so does the length along the bar 18 from line 12 to the point of intersection of bar 18 with the incident line 26. When the bar 22 is moved away from the line 12 the converse occurs.

From geometrical considerations, it will also be seen that the angle between the incident line 26 and a vertical line 32 drawn through a point or the axis of pivot pin 33 is equal to the angle $a_1$. It will also be observed that as the bar 22 moves toward or away from the line 12, the distance between pivot points 14 and 33 will decrease or increase. This is true because the pivot pin 33 is maintained coincident with the line or bar 16 which extends normally from the line 12. If now a line 35 is drawn from the point 33 to intersect the line 22 at 34, a distance from the point 33 equal to the distance from that point to the point 14, the line 35 may be taken as the refraction line of a wave originating at 14, which strikes the interface 11 or line 16 at an angle $a_1$ and is refracted along the line 35 at an angle $a_2$.

Since the instrument is utilized with drawing paper on which there will be marked a scale indicating distance, the distance between the shotpoint 14 and the interface line 16 may be taken to be equal to the propagation velocity $V_1$ in one media multiplied by a constant, while the distance between the interface line 11 or bar 16 and the selected depth at which the line 18 is located will be equal to the propagation velocity $V_2$ in the lower strata multiplied by the same constant K. This consideration is in accordance with Snell's law since $$\frac{KV_1}{KV_2} = \frac{V_1}{V_2}$$

The angle of refraction $a_2$ lies between the vertical line 32 and the refraction line 35. By geometrical considerations, the angle between the refraction line 35 and the vertical line or bar 22 is also equal to the refraction angle $a_2$. Accordingly, the distance from the point 33 to the intersection N of the line 16 with the line 22 varies with the sine of angle $a_2$. Thus, the sine of $a_1$ divided by the sine of $a_2$ equals $$\frac{M-33}{33-N}$$

and the distance 14–33 times the sine $a_1$ divided by the distance 33–34 times the sine $a_2$ equals $$\frac{KV_1}{KV_2}$$

The foregoing relations will also be apparent by the following analysis:

The product of $KV_1$ and the product of $KV_2$ respectively provide the spacing of the bar 16 from the shotpoint 14, and the spacing of the bar 18 from the bar 16. Then, from similar triangles, Fig. 3, where $A = M-33$, $B = 33'-29$, $B' = B = 33-N$,
$R_1 = 14-33$, and $R_2 = 33-34$, (1) $$\frac{V_1}{V_2} = \frac{KV_1}{KV_2} = \frac{A}{B}$$

but (2) $$\frac{A}{R_1} = \sin a_1$$

and $$\frac{B'}{R_2} = \sin a_2$$

therefore (3) $$A = R_1 \sin a_1$$

and $$B = R_2 \sin a_2$$

Now substituting in (1):

(4) $$\frac{V_1}{V_2} = \frac{A}{B} = \frac{R_1 \sin a_1}{R_2 \sin a_2}$$

But in the construction: $R_1 = R_2$. Therefore $$\frac{V_1}{V_2} = \frac{\sin a_1}{\sin a_2}$$

which means that the construction does maintain the angle $a_1$ and the angle $a_2$ in the desired incident-refracted relations, that is to say, the apparatus automatically functions to maintain the aforesaid ratios regardless of change in the angular position of the incident line 26. As that line is rotated about the pivot 14, as shown in Fig. 3, to change the incident angle $a_1$, the refractor line 35 is positioned to change the refraction angle $a_2$ in accordance with Snell's law.

Returning now to Fig. 2, the preferred arrangement which meets the foregoing requirements includes a series of gear teeth 38 formed along one side of a slot in the incident bar 26. The pivot pin 33, Figs. 2 and 8, has an upper end which is journaled in a guide or carriage 39. The upper part of carriage 39 is U-shaped, the upturned sides or legs of which slidably engage the sides of the bar 16, Fig. 8. A cover plate 39a is fastened to the upturned legs by means of four screws. A double bearing, provided by an opening 40 in plate 39a and an opening in the guide 39, provides stable support for the pivot pin 33. The U-shaped member 36 has an opening 41 for the pivot pin 33. Thus, it is pivotally connected to pin 33 and its downturned sides or legs slidably engage the incident arm 26.

Secured to the pivot pin 33 for engagement with the gear teeth 38 is a gear 42. A second gear 43 is also secured to the pin 33 for engagement with gear teeth 44 provided along a bar 45 slidably mounted within and forming a part of the assembly comprising the refraction bar 35. The lower end of the pin 33, which extends through an opening 46 in a frame member 47 of the refraction bar 35, is journaled in an opening 48a of a lower frame member 48. By means of three screws, the member 48 is rigidly secured to the downward extensions of the guide or carriage 39.

Figure 14:
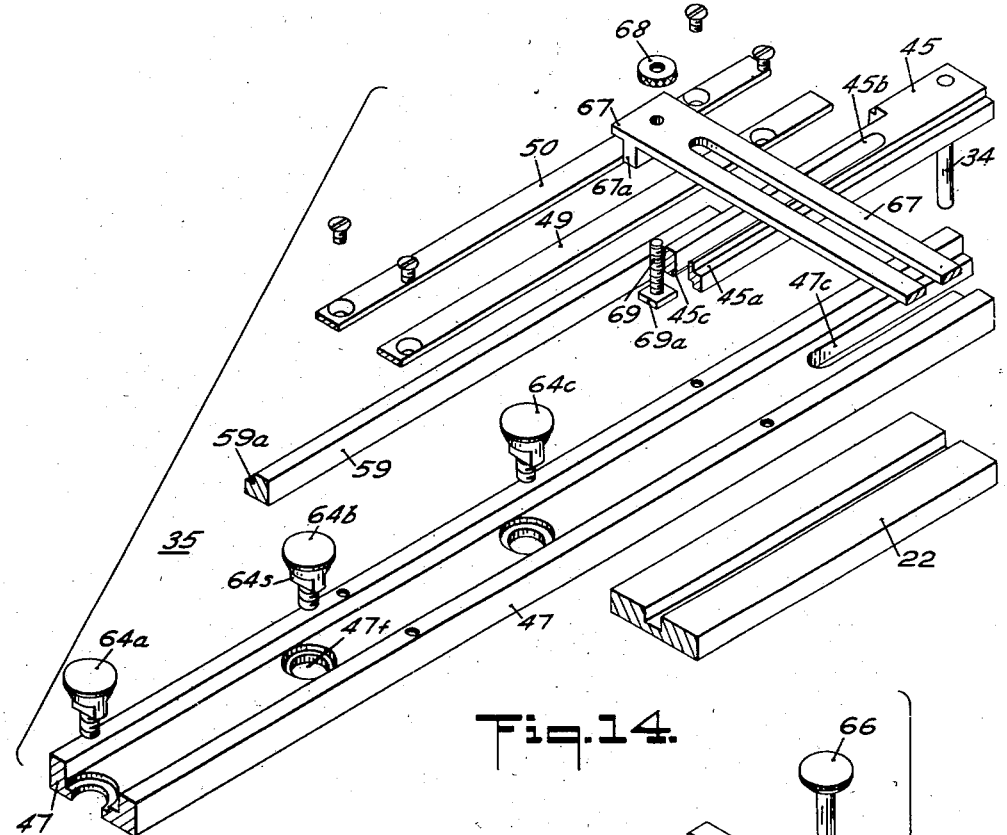
Fig. 14 is an exploded perspective of certain of the parts associated with the refraction arm 35.

The refraction bar frame 47 includes an upturned flange 47a which supports the rack gear 44 and maintains its engagement with the gear 43. The refraction bar frame member 47 through the greater portion of its length is U-shaped and there are attached to the upturned legs thereof guide strips 49 and 50. The guide strip 49 slightly overlaps the upturned leg to which it is attached as by screws and receives therebeneath a shoulder 45a, Fig. 14, provided on the bar 45. The bar 45 has connected thereto the guide pin 34 which extends downwardly, as viewed in Figs. 2 and 14, through an elongated slot 47c, Fig. 14, provided in the frame member 47 and slidably engages the groove in the bar 22.

If the end of the incident bar 26 be rotated around its pivot 14 in a clockwise direction as viewed in Fig. 2, it will be observed that the bar 22 will be moved toward the base member 12. The distance between the pins 14 and 33 will decrease and in decreasing, the gear 42, in mesh with the rack gear teeth 38, will rotate the pin 33 and the gear 43, Fig. 8. This rotation will result in moving the gear teeth 44 and the bar 45 upwardly or to the left to maintain the distance between pivot pins 14 and 33 equal to the distance between pivot pin 33 and guide pin 34. Though not essential, it has been found helpful manually to assist movement of the refraction bar 35. The positions of the parts after the incident bar 26 has been moved a substantial distance toward the base member 12 have been illustrated in Fig. 7, and in Fig. 6 the apparatus is in its fully-folded position in which it will be observed the pins 14, 33, and 34 are in vertical alignment. The fully-folded position is permitted by means of the offset in the base member 12 into which the pivot pin 14 extends and by means of the offset 22a of the bar 22 which permits it to encircle the pivot pin 14. In consequence, the center line of the bar 22 is vertically below the pivot pin 14.

With the instrument thus far described, refraction lines 51, 52 and 53, Fig. 1, may be directly drawn along the refraction arm 35 for corresponding incident lines 54, 55 and 56. The apparatus has been found particularly useful, however, in drawing the isotime curves which have already been discussed. They are drawn by means of markers, such as small pencils disposed within openings 57 and 58 in a time-bar 59. The time-bar 59 is slidably mounted in the frame member 47 and is retained therein by a ledge 59a, Fig. 14, which nests beneath the guide strip 50 and slidably engages one side of the bar 45. The movement of the time-bar 59 is so controlled that the markers or pencils disposed in the openings 57 and 58 will draw isotime curves for particular intervals of time after the initiation of the seismic waves. Such isotime curves have been illustrated in Fig. 1 and designated $T_1$ and $T_2$.

The timing device which controls the movement of the time-bar 59 comprises a timer bar 62 provided with an elongated slot 62a and a ratio-scale 63. It is rotatably and slidably supported from a selected one of pivot pins 64a, 64b, and 64c, Fig. 14, which extend downwardly through the frame member 47. Flattened shoulders 64s adjacent the head of the pivot pin 64b slidably engage the sides of the slot 62a in the bar 62. A nut 65, Fig. 5, when tightened serves to clamp the bar 62 against a shoulder of the pin 64b and prevents slidable movement with respect thereto without interfering with rotational movement of the pin 64b in the opening 47f, Fig. 14, of the frame 47.

Cooperating with the timer bar 62 is a slotted bar 67 pivotally connected thereto by a pivot pin 66, and which bar 67, Figs. 4 and 14, has a rectangular downturned end 67a which extends into a slot 45b in the bar 45. The underside of the bar 45 is provided with an elongated rectangular recess 45c into which extend flattened sides of a head 69a of a screw 69 provided with a fastening nut 68. It will be observed from Figs. 4 and 14 that the length of the downturned end 67a of the arm 67 is long enough to assure clearance between it and the stationary guide strip 49. When the nut 68 is loosened, the bar 67 and the screw 69 are free to slide lengthwise of the bar 45. However, when the nut 68 is tightened, the bar 67 is clamped to the bar 45 and moves with it.

The opposite end of the timer bar 62, Fig. 2, is pivotally and slidably connected by a pivot pin 70 to a slotted bar 71 which is attached by screws to the time bar 59. The bar 71 adjacent the bar 59 is undercut to clear the strip 50 and to provide a shoulder on the bar 71 which engages the time bar 59.

Again referring to Fig. 5, the pin 64b is rotatably mounted in the frame member 47. However, by loosening the nut 65 the bar 62 may be slid in one direction or the other relative to the pivot pin 64. It is positioned, by means of the scale 63, so that one segment, the distance between 64b and 66, bears the same ratio with respect to the other segment, the distance between 64b and 70, as $V_1$ bears to $V_2$. With the timer bar 62 so positioned, the nut 65, Fig. 5, is tightened to hold it in fixed position with respect to the pin 64b. Since the pin 64b is rotatably mounted in the frame member 47, the timer bar 62 may be rotated about the axis of the pivot pin 64b.

Now referring to Fig. 2, it will be recalled that as the refraction bar or assembly 35 is moved in a clockwise direction about its pivot 33 (the other accompanying actions also taking place), the bar 45, by means of the rack gear 44, is moved to the left with respect to the pin 33. Since the bar 67 is clamped to it, it also moves to the left, rotating the timer bar 62 in a counterclockwise direction. Thus, while the bar 45 moves to the left the connection of timer bar 62 with the bar 71 moves the time bar 59 to the right a distance equal to the ratio of $V_2$ with respect to $V_1$; that is, the bar 59 moves $$\frac{V_2}{V_1}$$

times the amount or extent of movement of the bar 45. Since this relationship obtains at all times, curves drawn by markers or pencils suitably secured to the bar 59, as in the openings 57 and 58, will draw on cross-section paper below the instrument isotime curves of any seismic wave originating at the origin coinciding with the pivot pin 14 and refracted at the interface corresponding with the location of the bar or arm 16 and terminating at a selected one of the curves.

To provide flexibility in operating conditions, the several pins 64a, 64b and 64c, Fig. 14, similarly extend downwardly through the frame member 47. Accordingly, the timer bar 62 may be located nearer or farther away from the bar 22 than for the location determined by the pin 64b. By loosening the nut 68, the bar 67 may be moved along the slotted bar 45 to provide the desired angle between it and the timer bar 62. In the new position, of course, the time-bar 59 may be moved to a different position.

By observing the angles with the parts moved to approximately their final positions, one of the pivot pins 64a, 64b or 64c may be selected. The instrument is then moved to its folded position as shown in Fig. 6. In the folded position, final adjustments of the instrument may be made. They are straight-line or linear adjustments since, as will be seen from Fig. 1, a ray originating from the shotpoint 10 will travel vertically through the first stratum at a velocity $V_1$ and then vertically through the adjacent stratum with a velocity $V_2$. Accordingly, with the pivot pin 14 located on the chart at a point corresponding with the shotpoint, the bar 16 is positioned to correspond with the location of the interface. Accordingly, the distance from the shotpoint 14 to the pin 33 at the interface, divided by the velocity $V_1$, will represent the time $T_1$ for the travel of a seismic wave from the point of origin 14 to the interface. Similarly, the distance from the interface or pivot pin 33 to the location of the opening 57 for the first pencil divided by the velocity $V_2$ will give a time $T_2$ required for the passage of the wave or ray to the pencil location. By suitably adjusting the position of parts, the total time $T_1$ plus $T_2$ may be made to equal any desired time interval; for example, a pencil located in opening 57 may be located a time interval from the original equal to .5 second, while the pencil in the opening 58 may be located to correspond with a time interval of .7 second. Obviously, by adding other openings or adjustable pencil-clamps, additional curves may be simultaneously drawn for selected desired time intervals.

In the description of the adjustments just described, it has, of course, been assumed the interface bar 16 has been properly set with reference to the scale 13 a distance below the pivot pin 14 equal to the known distance in the problem under consideration, and that the bar 18 has been set a distance below the bar 16 such that the requirements of Snell's law have been met; namely, $$\frac{KV_1}{KV_2} = \frac{V_1}{V_2}$$

Thereafter, the timer bar 62 is set in the manner heretofore described and the instrument is then unfolded so that the pencils in the openings 57 and 58 draw isotime curves. The apparatus is then closed or moved to its folded position as shown in Fig. 6 and the pencils moved to new positions for the drawing of additional isotime curves.

While a preferred embodiment of the invention has been described, it is to be understood modifications may be made within the scope of the appended claims.

What is claimed is:

1. A curved-drawing instrument comprising a base member having a time-depth scale, an incident bar, means pivotally supporting one end of said incident bar from said base member, an interface bar extending at right angles from said base member at a position corresponding with an interface under study, a refractor bar, pivotal means interconnecting said incident bar said interface bar and said refractor bar, said pivotal means being mounted for slidable movement along said interface bar and including gear teeth, said incident bar and said refractor bar also including gear teeth meshing with those of said pivotal means, a guide bar, means for maintaining said guide bar parallel to said frame member, a second bar disposed below said interface bar and extending at right angles from said frame member, pivotal means slidably interconnecting said second bar, said guide bar and said incident bar for positioning said guide bar with change of angle of said incident bar with respect to said base member, and means pivotally and slidably interconnecting said refractor bar and said guide bar.

2. An apparatus for plotting seismic data comprising a base member having a time-depth scale, an incident bar, means pivotally supporting one end of said incident bar from said base member, an interface bar extending at right angles from said base member at a position corresponding with an interface under study, a refractor bar, pivotal means interconnecting said incident bar said interface bar and said refractor bar, said pivotal means being mounted for slidable movement along said interface bar and including gear teeth, said incident bar having gear teeth meshing with those of said pivotal means, said refractor bar including a slide including gear teeth meshing with those of said pivotal means, a guide bar, means for maintaining said guide bar parallel to said frame member, a second bar disposed below said interface bar and extending at right angles from said frame member, pivotal means slidably interconnecting said second bar, said guide bar and said incident bar for positioning said guide bar with change of angle of said incident bar with respect to said base member, means pivotally and slidably interconnecting said slide and said guide bar for positioning said refractor bar in conformity with Snell's law, marking means carried by said refractor arm, and means operable by said slider for positioning said marking means for drawing isotime curves.

3. An apparatus for plotting seismic data which includes the solution of Snell's law in the form of $$\frac{KV_1}{KV_2} = \frac{\sin a_1}{\sin a_2}$$

where K is a constant, $V_1$ and $V_2$ are velocities above and below an interface, and $a_1$ and $a_2$ are respectively the incident angle and the refracted angle which a ray makes with respect to a line normal to said interface, comprising a base member, an incident arm having one end pivotally connected to said base member, an interface bar extending at right angles to said base member at a distance on said scale equal to $KV_1$, a second bar disposed below said interface bar a distance equal to $KV_2$ and extending at right angles to said base member, a guide, means for maintaining said guide normal to said interface bar during movement toward and away from said base member, means for positioning said guide in accordance with angular change of said incident arm and comprising pivot means interconnecting said guide, said incident arm and said second bar and slidable with respect to each of them, a refractor arm, and means operable by said incident arm and said guide for predetermining the position of said refractor arm in accordance with Snell's law.

4. An apparatus for solving Snell's law in the form of $$\frac{KV_1}{KV_2} = \frac{\sin a_1}{\sin a_2}$$

where K is a constant, $V_1$ and $V_2$ are velocities above and below an interface and $a_1$ and $a_2$ are respectively the incident angle and the refracted angle which a ray makes with respect to a line normal to said interface, comprising a base member having a time-distance scale, an incident arm having one end pivotally connected to said base member, an interface bar extending at right angles to said base member at a distance below said pivoted end of said incident arm equal to $KV_1$, a second bar disposed below said interface bar a distance equal to $KV_2$ and extending at right angles to said base member, a parallel guide, means for supporting it for movement toward and away from, and for maintaining it parallel to, said base member, a first pivotal means slidably carried by said interface bar and pivotally interconnecting said interface bar and said incident bar, a second pivotal means slidably mounted with respect to said second bar, said incident bar and said parallel guide and pivotally interconnecting them, a refractor arm pivoted at one end to said first pivotal means, means extending from said refractor arm and slidably connected to said parallel guide, and means for positioning said refractor arm by maintaining the distance from said second pivotal means to said extending means equal to the distance from said one end of said incident arm to said first pivotal means.

5. An apparatus for plotting seismic data which includes the solution of Snell's law in the form of $$\frac{KV_1}{KV_2} = \frac{\sin a_1}{\sin a_2}$$

where K is a constant, $V_1$ and $V_2$ are velocities above and below an interface, and $a_1$ and $a_2$ are respectively the incident angle and the refracted angle which a ray makes with respect to a line normal to said interface, comprising a base member having a time-distance scale, an interface bar extending at right angles to said base member at a distance on said scale equal to $KV_1$, an incident arm pivoted at one end to said base member at a point with respect to said scale corresponding with the point of origin of a ray whereby the angle of said incident arm with respect to a vertical line from its pivoted end corresponds with the angle $a_1$ and the distance from said vertical line to the point of intersection of said arm with said interface bar varies with $\sin a_1$, a second arm extending at right angles to said base member at a distance on said scale below said interface bar equal to $KV_2$, a guide parallel to said base member, means interconnecting said guide and base member for maintaining said guide parallel thereto during movement toward and away therefrom, a refractor arm, pivot means slidable along said interface bar and connected to one end of said refractor arm, means for establishing an angular position of said refractor equal to angle $a_2$ comprising means interconnecting said guide and said refractor arm and slidable with respect to each of them, and means for maintaining the distance from said pivoted end of said incident arm to said point of intersection equal to the distance from said point of intersection to said pivot means.

6. An apparatus for plotting seismic data which includes the solution of Snell's law in the form of $$\frac{KV_1}{KV_2} = \frac{\sin a_1}{\sin a_2}$$

where $K$ is a constant, $V_1$ and $V_2$ are velocities above and below an interface, and $a_1$ and $a_2$ are respectively the incident angle and the refracted angle which a ray makes with respect to a line normal to said interface, comprising a base member having a time-distance scale, an interface bar extending at right angles to said base member at a distance on said scale equal to $KV_1$, an incident arm pivoted at one end to said base member at a point with respect to said scale corresponding with the point of origin of a ray whereby the angle of said incident arm with respect to a vertical line from its pivoted end corresponds with the angle $a_1$ and the distance from said vertical line to the point of intersection of said arm with said interface bar varies with sin $a_1$, a second arm extending at right angles to said base member at a distance on said scale below said interafce bar equal to $KV_2$, a guide parallel to said base member, means interconnecting said guide and base member for maintaining said guide parallel thereto during movement toward and away therefrom, a refractor arm, pivot means slidable along said interface bar and connected to one end of said refractor arm, means slidable lengthwise of said refractor bar, means interconnecting said slidable means and said guide and movable lengthwise of said guide, said pivot means including gear means, said incident arm having a rack gear meshing with said gear means, and said slidable means having a rack gear meshing with said gear teeth, said meshing gears upon a change in the distance from said pivoted end of said incident arm to said point of intersection producing a like change in the distance from said point of intersection to said interconnecting means thereby to position said refractor arm so that the angle made thereby with respect to said guide is equal to angle $a_2$ for a wide range of angles of $a_1$.

7. The combination set forth in claim 6 in which a timer bar is pivotally connected to said refractor arm, the lengths of said timer bar on opposite sides of said refractor arm bearing a ratio equal to the ratio of $$\frac{V_1}{V_2}$$

means interconnecting the end of the length of said timer bar corresponding with $V_1$ and said slidable means to rotate said bar, an isotime bar slidably carried by said refractor arm, and means interconnecting the opposite end of said timer bar and said isotime bar for positioning it to determine isotime curves of rays emanating from said point of origin.

8. The combination set forth in claim 6 in which a timer bar is pivotally connected to said refractor arm, the lengths of said timer bar on opposite sides of said refractor arm bearing a ratio equal to the ratio of $$\frac{V_1}{V_2}$$

means interconnecting the end of the length of said timer bar corresponding with $V_1$ and said slidable means to rotate said bar, an isotime bar slidably carried by said refractor arm, at least one marker supported by said isotime bar at a position thereon representative of a known time interval after initiation of said rays from said point of origin, and means interconnecting the opposite end of said timer bar and said isotime bar for moving said marker along a path corresponding with an isotime curve of rays emanating from said point of origin.

9. An instrument for determining the change in direction of propagation of wave energy at the interface of strata having different propagation velocities comprising a base member having a time-distance scale, an incident-angle bar pivotally supported from said base member at a point thereon corresponding with the point of origin of said wave energy, an interface bar normal to said base member at a distance on said scale from said point of origin related to the propagation velocity of the upper stratum, a reference bar normal to said base member at a distance on said scale from said interface bar similarly related to the propagation velocity of the lower stratum, a movable guide bar at all times parallel to said base member, a first pivotally interconnected means slidable with respect to said incident-angle bar, to said guide bar and to said reference bar, a second pivotally interconnected means slidable with respect to said incident-angle bar and to said interface bar, a refraction bar, and means for positioning said refraction bar from said second means at such an angle that the distance from said point of origin to said second pivotally interconnected means is equal to the distance from said second means to the intercept of said refractor bar with said guide bar.

10. The combination set forth in claim 9 in which a time-bar is slidably carried by said refraction bar, means operable as the angle of said incident-angle bar increases from zero for sliding said time-bar along said refraction bar a distance equal to the ratio of the propagation velocity of said wave energy in said lower stratum to that in said upper stratum multiplied by the increase from its zero-angle value in the distance from said point of origin to said interface, and means on said time-bar representative of at least one time interval after initiation of said energy.

11. An instrument for determining the location of wave energy below a velocity interface a given time interval after initiation of said energy from a point of origin, the propagation velocities of said energy in strata above and below said interface materially differing from each other, comprising an incident-angle bar, a refraction-angle bar, means for positioning said refraction-angle bar at refraction angles corresponding with a range of incident angles for said incident-angle bar, a time-bar slidably carried by said refraction-angle bar, means operable as the angle of said incident-angle bar increases from zero for sliding said time-bar along said refraction-angle bar a distance equal to the ratio of the propagation velocity of said energy in said lower stratum to that in said upper stratum multiplied by the increase from its zero-angle value in the distance from said point of origin to said interface, and means on said time-bar representative of at least one time interval after initiation of said energy.

GLENN M. McGUCKIN.

REFERENCES CITED

The following references are of record in the file of this patent:

UNITED STATES PATENTS

| Number | Name | Date |
| --- | --- | --- |
| 2,210,939 | Garrett | Aug. 13, 1940 |